(12) United States Patent
Watson et al.

(10) Patent No.: US 6,531,109 B2
(45) Date of Patent: Mar. 11, 2003

(54) TREATMENT OF A COMBUSTIBLE GAS STREAM

(75) Inventors: Richard William Watson, Guildford (GB); Stephen Rhys Graville, Sheffield (GB)

(73) Assignee: The BOC Group, plc, Windlesham (GB)

( * ) Notice: Subject to any disclaimer, the term of this patent is extended or adjusted under 35 U.S.C. 154(b) by 0 days.

(21) Appl. No.: 09/953,731

(22) Filed: Sep. 17, 2001

(65) Prior Publication Data

US 2002/0015675 A1 Feb. 7, 2002

Related U.S. Application Data

(62) Division of application No. 09/149,671, filed on Sep. 9, 1998, now Pat. No. 6,312,651.

(30) Foreign Application Priority Data

Sep. 12, 1997 (GB) .............................................. 9719512

(51) Int. Cl.⁷ .............................................. C01B 17/04
(52) U.S. Cl. ................................ 423/573.1; 423/574.1; 423/576.8
(58) Field of Search ..................... 423/573.1, 574.1, 423/576.8

(56) References Cited

U.S. PATENT DOCUMENTS

| | | | |
|---|---|---|---|
| 3,954,386 A | 5/1976 | Harpenslager | 431/285 |
| 4,035,158 A | 7/1977 | Scott | 422/160 |
| 4,133,643 A | 1/1979 | Choulat | 422/182 |
| 4,331,630 A | 5/1982 | Van Pool | 422/160 |
| 4,481,181 A | * 11/1984 | Norman | 423/573 G |
| 4,596,699 A | 6/1986 | Desgrandschamps | 422/160 |
| 4,933,163 A | 6/1990 | Fischer | 423/574.1 |
| 4,988,287 A | 1/1991 | Stegelman | 431/284 |
| 5,139,765 A | 8/1992 | Szekely | 423/574.1 |
| 6,083,466 A | * 7/2000 | Ojavdan et al. | 423/210 |

FOREIGN PATENT DOCUMENTS

| | | |
|---|---|---|
| EP | 0315225 A1 | 5/1989 |
| EP | 0440141 A2 | 8/1991 |
| WO | WO9626157 A | 8/1996 |

OTHER PUBLICATIONS

J.B. Hyne; "Getting Sulfur out of Gas" CHEMTECH, Oct. 1982, pages 628–637.
"Leading Burnder Designs for Sulphur Plants" Sulphur, No. 224, Jan. 1, 1993, pages 23–28, 30–34.

* cited by examiner

Primary Examiner—Steven Bos
Assistant Examiner—Timothy C. Vanoy
(74) Attorney, Agent, or Firm—Wan Yee Cheung; Salvatore P. Pace

(57) ABSTRACT

A process and apparatus for recovering sulphur from a combustible gas stream comprising hydrogen sulphide, air, commercially pure oxygen or oxygen-enriched air. The combustible gas stream are fed to a burner which fires into an elongate furnace. A longitudinally extending flame is created which as a relatively oxygen-poor endothermic hydrogen sulphide dissociation region, and a relatively oxygen-rich, intense hydrogen sulphide combustion region. Residual hydrogen sulphide reacts with sulphur dioxide formed by the combustion to produce sulphur vapor. The furnace has an aspect ratio of about 8:1. The flame diverges from its root to occupy at its maximum cross-sectional area at least about 80% of the cross-sectional area of the furnace interior coplanar therewith.

8 Claims, 1 Drawing Sheet

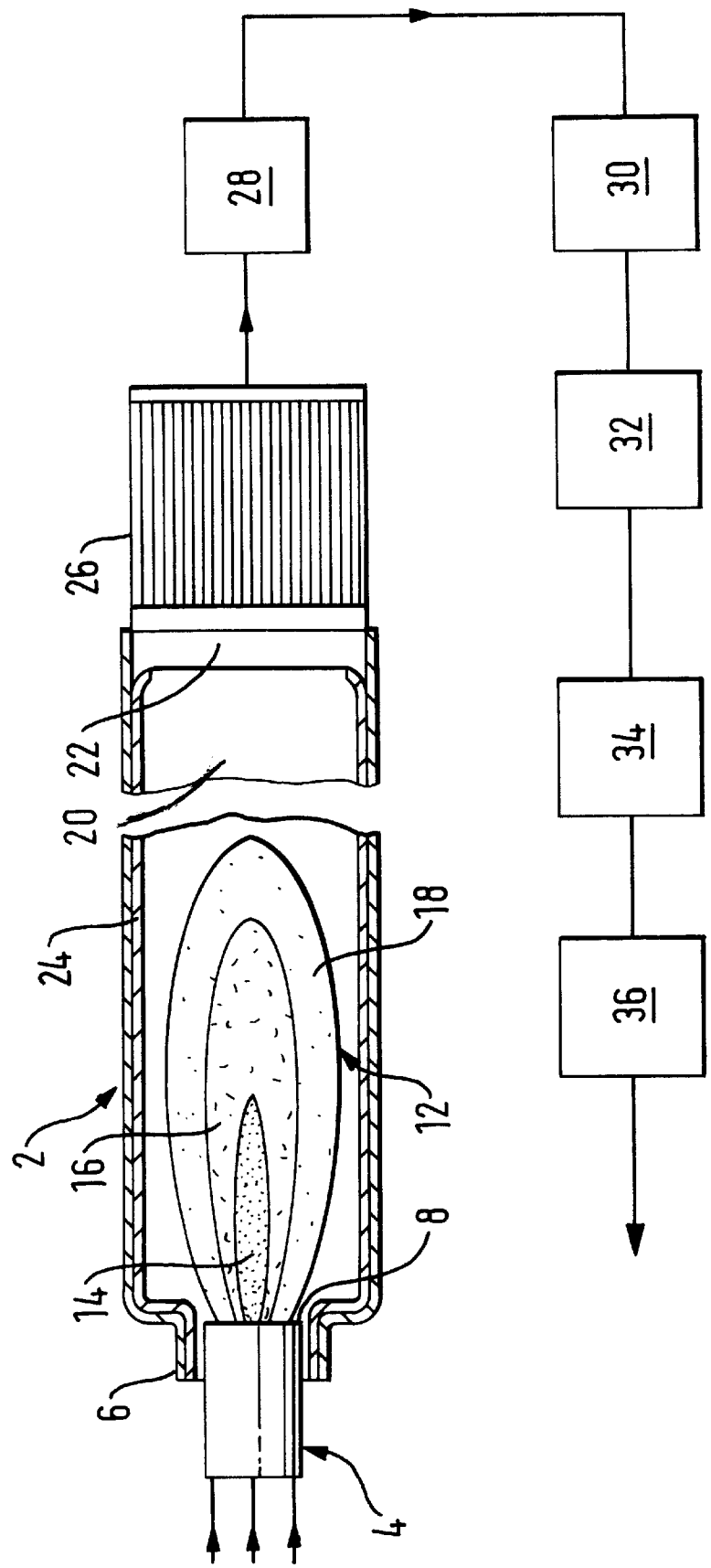

TREATMENT OF A COMBUSTIBLE GAS STREAM

RELATED APPLICATION

This is a divisional of application Ser. No. 09/149,671 filed Sep. 9, 1998 now U.S. Pat. No. 6,312,651.

BACKGROUND OF THE INVENTION

This invention relates to a method and apparatus for treating a combustible gas stream containing hydrogen sulphide.

Hydrogen sulphide containing gas streams (sometimes referred to as 'acid gas streams') are typically formed in oil refineries and natural gas processing units. Such streams cannot be vented directly to the atmosphere because hydrogen sulphide is poisonous. A conventional method of treating a hydrogen sulphide gas stream (which, if desired, has been pre-concentrated) is by the Claus process. In this process a part of the hydrogen sulphide content of the gas stream is subjected to combustion in a furnace so as to form sulphur dioxide. The sulphur dioxide then reacts in the furnace with residual hydrogen sulphide so as to form sulphur vapour. The reaction between hydrogen sulphide and sulphur dioxide does not go to completion. The effluent gas stream from the furnace is cooled and sulphur is extracted, typically by condensation, from the cooled effluent gas stream. The resulting gas stream, still containing residual hydrogen sulphide and sulphur dioxide, passes through a train of stages in which catalysed reaction between the residual hydrogen sulphide and the residual sulphur dioxide takes place. Resulting sulphur vapour is extracted downstream of each such stage. The effluent gas from the most downstream of the sulphur extractions may be incinerated or subjected to further treatment, e.g. by the SCOT or Beavon process, in order to form a gas stream which can be vented safely to the atmosphere.

Air may be used to support the combustion of hydrogen sulphide in the initial part of the process. The stoichiometry of the reactions that take place is such that relatively large volumes of nitrogen (which is of course present in the air that supports the combustion) flow through the process and therefore place a ceiling on the rate at which the gas stream containing hydrogen sulphide can be treated in a furnace of given size. This ceiling can be raised by using commercially pure oxygen or oxygen-enriched air to support the combustion of the hydrogen sulphide.

Most Claus plants are equipped with right cylindrical furnaces having a length to internal diameter ratio in the range of from two to four. The furnaces are typically cross-fired or tangentially-fired by a burner or burners mounted at the side. Cross or tangentially fired burners achieve good mixing of the reacting chemical species. If desired, mixing can be enhanced by equipping the furnace with baffles or checkerwork walls.

A particular perceived disadvantage of such cross or tangentially fired arrangements is that if commercially pure oxygen or oxygen-enriched air is used to support the combustion of the hydrogen sulphide there is a relatively high risk of damage to the refractory lining of the furnace being created by the resulting increase in flame temperature. There are a number of proposals in the art to solve this problem. Some proposals involve introduction of flame moderators such as water into the furnace; others involve recycling to the furnace gas from a downstream part of the plant so as to moderate the temperature in the furnace; and yet others employ a plurality of furnaces so as to limit the amount of combustion that is performed in each individual furnace, thereby obviating the need for an external flame moderator or to recycle gas from a downstream part of the furnace. All these proposals, however, add to the complexity of the plant.

One way of reducing the potential for damage to the refractory lining when commercially pure oxygen or oxygen-enriched air is used to support combustion of hydrogen sulphide is to employ axially or longitudinally fired burners mounted on the back wall instead of cross or tangentially fired burners mounted at the side of the furnace. Such axially or longitudinally fired burners have been shown to give average residence times comparable with those of cross or tangentially fired burners (typically from 1 to 2 seconds) at design throughput.

The use of such an axially or longitudinally fired burner is disclosed in European patent application 0 315 225A in which there is a central pipe for oxygen, at least one second pipe for hydrogen sulphide containing feed gas which coaxially surrounds the central pipe, and an external coaxial pipe for air. The burner is used when the hydrogen sulphide feed gas contains at least 5% by volume of hydrocarbons or carbon dioxide. The oxygen velocity at the outlet of the burner is in the range of from 50 to 250 meters per second and the corresponding feed gas velocity is in the range of 10 to 30 meters per second. Temperatures in the range of from 2000 to 3000° C. are generated in the core of the burner flame, and a gas mixture having a temperature in the range of 1350 to 1650° C. leaves the furnace. This gas mixture contains at least 2% by volume of carbon monoxide and at least 8% by volume of hydrogen.

WO-A-96/26157 also discloses the use of an axially or longitudinally fired burner in the Claus process. Generally parallel flows of a first gas containing hydrogen sulphide and a second gas enriched in oxygen are supplied to the tip of the burner. The ratio of the velocity of the first gas to the velocity of the second gas is selected so as to be in the range of from 0.8:1 to 1.2:1. In typical examples the burner fires longitudinally into a furnace having a length of 8 m and a diameter of 1.5 m. The diameter of the burner is 0.4 m.

We have discovered that a problem arises when an axially or longitudinally fired burner is employed in a Claus furnace. This problem is that considerable short circuiting of gas molecules from the burner tip to the furnace exit occurs. Moreover, the provision of baffles or checkerwork walls within the furnace has little effect in reducing this short-circuiting.

It is an aim of the present invention to provide a method of and an apparatus for treating a combustible gas stream containing hydrogen sulphide which solve or ameliorate this problem. Other aims of the invention will become apparent from the ensuing description.

SUMMARY OF THE INVENTION

According to the present invention there is provided a method of treating a combustible gas stream containing hydrogen sulphide, comprising burning so as to form sulphur dioxide a part of the hydrogen sulphide content of the gas stream in a flame which extends generally longitudinally within a furnace from a root at or near its upstream end towards an outlet at its downstream end causing oxygen molecules to enter the flame to support combustion of hydrogen sulphide therein so as to form sulphur dioxide and water vapour, creating within the flame one or more relatively oxygen-poor endothermic, hydrogen sulphide dissociation regions in which sulphur vapour is formed by thermal dissociation and one or more relatively oxygen-rich combustion regions, allowing residual hydrogen sulphide to react within the furnace with said sulphur dioxide so as to form further sulphur vapour, withdrawing an effluent gas stream containing sulphur vapour, water vapour, hydrogen sulphide and sulphur dioxide from said outlet end of the furnace, and recovering sulphur from the effluent gas stream, wherein the furnace is elongate, having an aspect ratio of at least 6:1, and the flame diverges from its root to occupy at its maximum cross-sectional area at least 80% of the cross-sectional area of the furnace interior coplanar therewith.

The invention also provides apparatus for treating a combustible gas stream containing hydrogen sulphide, comprising a furnace for the formation of sulphur vapour by reaction of hydrogen sulphide with sulphur dioxide, a burner positioned so as to be able to fire longitudinally into the furnace and operable so as to create, in use, a flame which extends longitudinally within the furnace from a root at or near its upstream end towards its downstream end, at least one first inlet for the said combustible gas stream associated with the burner, at least one second inlet for a gas containing oxygen molecules to enter the flame to support combustion therein, the first and second inlets and the burner being arranged such that, in use, some of the hydrogen sulphide burns to form sulphur dioxide and there is created one or more relatively oxygen-poor endothermic, hydrogen sulphide dissociation regions within the flame in which sulphur is formed by the thermal dissociation, and one or more relatively oxygen rich, intense, combustion regions an outlet from the furnace at its downstream end for an effluent gas stream comprising hydrogen sulphide, sulphur dioxide, water vapour and sulphur vapour, and means for extracting the sulphur vapour from the effluent gas stream, wherein the furnace has an aspect ratio at least of 6:1 and the burner and its inlets are arranged such that, in use, the flame diverges from its root to occupy at its maximum cross-sectional area at least 80% of the cross-sectional area of the furnace interior coplanar therewith.

The aspect ratio of a cylindrical furnace is the ratio of its (axial) internal length to internal diameter. The aspect ratio of a parallelapipedal furnace is the ratio of its (axial) internal length to half the sum of its internal height and internal width. References to the cross-sectional area of the furnace are to cross-sections taken normally to the longitudinal art is of the burner.

By allowing the flame to expand rapidly and fill substantially the entire cross-section of the furnace interior, a high average molecular residence time, typically in the order of two to three seconds can be achieved without substantial short circuiting of gas molecules from the burner tip to the furnace exit. The conversion of hydrogen sulphide to sulphur is therefore enhanced.

Notwithstanding the fact that the flame expands substantially to fill the entire cross-section of the furnace interior, the method and apparatus are particularly suitable for use when at least some of the oxygen molecules are supplied to the flame from a source of commercially pure oxygen or oxygen-enriched air. Three discrete mechanisms contribute to the moderation of furnace refractory temperatures with the result that the method and apparatus according to the invention can be operated at a given refractory temperature with a relatively high ratio of oxygen molecules to nitrogen molecules in comparison with previously known methods.

The first of these mechanisms arises from the aspect ratio of the furnace. An elongate furnace having an aspect ratio of at least 6:1 has in comparison with a relatively short, fat furnace, of the kind typically used, a relatively low mean beam length for radiation. In fact in a cylindrical furnace of aspect ratio of 2:1 or greater, the mean beam length approximates to the furnace diameter. Therefore, the average gas emissivity and the radiant heat transfer rate from the flame to the furnace refractory is relatively low, having the effect of holding heat within the gases over an enhanced length of furnace. This heat can then be absorbed in the endothermic dissociation reactions, particularly the decomposition of hydrogen sulphide. The reduction in mean beam length for radiation therefore makes it possible to create higher temperatures in the oxygen-rich zones of the flame than would otherwise be possible without damaging the furnace refractory.

The second of the mechanisms which contributes to the moderation of furnace refractory temperature is simply that a large aspect ratio furnace has a larger external wall area than a shorter, fatter, furnace of the same volume, and therefore, in operation, undergoes heat loss at a greater rate. (Indeed, if the method according to the invention is operated with air as the sole source of oxygen molecules to the combustion of the hydrogen sulphide, it may be desirable to provide thermal insulation for the furnace so as to ensure that the walls are maintained at a sufficiently high temperature (at least 140° C., and preferably at least 190° C.) to prevent acid condensation on the inner-surfaces of the walls.)

The third of the mechanisms which contributes to the moderation of furnace refractory temperature is the creation of an oxygen-poor region or regions within the flame zone in which thermal dissociation of hydrogen sulphide takes place. The thermal dissociation is endothermic and thereby has a cooling effect on the flame. Moreover, since sulphur vapour is formed directly by the thermal dissociation of hydrogen sulphide, the amount of sulphur vapour that is formed by reaction of sulphur dioxide with hydrogen sulphide is reduced. There is therefore a reduced demand for sulphur dioxide and, thus, fewer oxygen molecules need to be provided. In other words, the temperature moderating effect of creating an oxygen-poor hydrogen sulphide thermal dissociation region is twofold. Firstly, there is a direct cooling effect by virtue of the endothermic nature of the thermal dissociation. Secondly, the demand for oxygen is reduced, and thus the amount of heat generated by the combustion of hydrogen sulphide is diminished.

The result of these three mechanisms is that for a given composition of the combustible gas stream containing hydrogen sulphide, it becomes possible to supply fewer nitrogen molecules with the oxygen molecules that are employed to support combustion of the hydrogen sulphide, i.e. the proportion of the oxygen molecules that can be supplied from a source of commercially pure oxygen can be increased in comparison with comparable known processes.

A wide range of techniques can be employed in order to create the oxygen-poor thermal hydrogen sulphide dissociation region or regions and the oxygen-rich hydrogen sulphide combustion region or regions. (It is to be understood that some combustion may take place in the dissociation region or regions and some thermal dissociation of hydrogen sulphide may take place in the combustion region or regions.) In particular, the combustion may be staged. For example, hydrogen sulphide may be introduced into two radially spaced apart regions of the flame at its proximal end so as to create two discrete flows of hydrogen sulphide and the supply of oxygen molecules arranged such that a preponderance of the oxygen molecules becomes mixed with one flow but not the other. Alternatively, or in addition, only some of the oxygen molecules may be introduced at the proximal end of the flame. The rest of the oxygen molecules may be added at one or more spaced locations downstream of the root of the flame. One or more oxygen lances may be used for this purpose.

The oxygen-poor thermal hydrogen sulphide dissociation region or regions preferably have a mole ratio of hydrogen sulphide to oxygen greater than about 2.5:1, more preferably greater than about 4:1. The oxygen-rich combustion region or regions preferably have a mole ratio of hydrogen sulphide to oxygen less than about 1.8:1.

The length of the flame is preferably from 40 to 60% of the axial length of the furnace. The precise length of the flame is governed by the physical design and aerodynamics of the burner and by whether any of the oxygen is introduced directly into the flame downstream of its root.

Preferably, some of the oxygen molecules are supplied to the root of the flame from a flow of air which surrounds separate flows of hydrogen sulphide and oxygen-enriched air or oxygen.

Preferably, an oxygen-rich, intense combustion region is created along the axis of the furnace, and an oxygen-poor, hydrogen sulphide thermal dissociation region is created in a surrounding region contiguous thereto.

The burner is preferably mounted coaxially with the furnace and is preferably of the tip-mixed kind. Its diameter is preferably about half that of the furnace.

The effluent gas stream is preferably cooled in a waste heat boiler, and the cooled effluent gas stream is preferably passed to a condenser in which sulphur vapour is condensed therefrom. The effluent gas stream is preferably subjected downstream of the sulphur condenser to at least one stage of catalytic reaction between hydrogen sulphide and sulphur dioxide.

The method and apparatus according to the present invention are particularly suited to the treatment of a gas stream whose mole fraction of hydrogen sulphide and other combustibles is at least about 0.7.

BRIEF DESCRIPTION OF THE DRAWING

The method and apparatus according to the present invention will now be described, by way of example, with reference to the accompanying drawing which is a schematic flow diagram of a Claus plant for the recovery of sulphur from hydrogen sulphide.

The drawing is not to scale.

DETAILED DESCRIPTION OF THE INVENTION

Referring to the drawing, a furnace 2 is fitted at one end thereof with a burner 4 which fires into the interior of the furnace 2. The burner 4 is coaxial with the longitudinal axis of the furnace 2 and is set back from the main body of the furnace 2, at least its distal end being located within a quarl 6. The burner 4 is fed with three gas streams which do not impinge upon one another until downstream of the tip 8 of the burner 4. A first of these gas streams comprises hydrogen sulphide and carbon dioxide. Typical compositions include at least about 90% by volume of hydrogen sulphide. Other compositions may include ammonia and/or hydrocarbons as additional combustible components.

A second of the gas streams supplied to the burner 4 comprises a stream of impure oxygen or oxygen-enriched air. This stream typically contains at least about 90% by volume of oxygen, with the balance comprising nitrogen and argon. The second gas stream may typically be supplied from a pressure swing adsorption plant for separating air. Alternatively it may be supplied from a plant for separating air by distillation. In another alternative, the oxygen is supplied from a storage vessel containing liquid oxygen. If the source of the oxygen is a plant for separating air by distillation or a storage vessel for liquid oxygen, the oxygen typically has a purity of at least about 98%. The third of the gas streams supplied to the burner 4 comprises air unenriched in oxygen.

The burner 4 is formed with internal passages (not shown) and is typically provided at its distal end or tip 8 with an end plate (not shown) such that an elongate longitudinally extending flame 12 is formed in operation of the burner having three distinct zones or sections 14, 16 and 18. The innermost zone 14 is an endothermic, hydrogen sulphide thermal dissociation zone which is essentially starved of oxygen such that thermal dissociation of hydrogen sulphide by the reaction:

$$H_2S \rightarrow H_2 + S$$ 

predominates over any combustion of hydrogen sulphide according to the reaction:

$$2H_2S + 3O_2 \rightarrow 2H_2O + 2SO_2.$$ 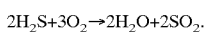

The zone 16 surrounds the innermost zone 14 and is a particularly high temperature, oxygen-rich zone in which combustion reactions predominate over any thermal dissociation of hydrogen sulphide. The zone 16 thus creates the necessary temperature to ensure that the innermost zone 14 is at a temperature of at least about 1200° C. and preferably above about 1600° C. In order to create such a zone 16, it is desirable to direct a part of the hydrogen sulphide-containing feed gas stream and a part or all of the impure oxygen stream into it. The zone 18 of the flame is an outermost zone which is at a lower temperature than the zone 16. Combustion rather than thermal dissociation of hydrogen sulphide may predominate in the zone 18 and may be supported by unenriched air flow to the burner, or by a flow of air which has only a limited degree of oxygen-enrichment, thereby making it possible for the temperature of the zone 18 to be less than the temperature of the zone 16. In any event, however, the combustion occurs in the zone 18 at stoichiometries well below those required for the overall Claus reaction. The temperature in the zone is not high enough to damage the refractory lining of the furnace even if pure oxygen is used.

It can alternatively be arranged that the zones 14 and 16 be reversed, that is to say that the zone 14 is operated relatively oxygen-rich and at a high temperature such that combustion of hydrogen sulphide takes place, and the zone 16 is operated relatively oxygen-poor such that a considerable degree of thermal dissociation of hydrogen sulphide takes place in this zone. A suitable burner (not shown) has an inner cylindrical passage and an outer annular passage for the combustible gas both terminating in a common place normal to the axis of the burner. There is an intermediate annular oxygen-enriched air passage terminating in a nozzle having a distal end which is coplanar with the outlets of the other two passages. The nozzle has orifices which at their proximal ends communicate with the intermediate passage. Some of the orifices are included in the direction of the flow towards the axis of the burner, and others away from it. An outermost air passage is typically defined between the body of the burner and a port through which the distal end of the burner enters the furnace. The number and orientation of the orifices may be chosen so as to provide oxygen-poor and oxygen-rich regions in the flame.

Referring again to the drawing, the furnace 2 has an elongate configuration. Its aspect ratio is preferably in the range of about 6:1 and about 12:1 (more preferably in the range of about 8:1 and about 12:1) and is of hollow right-cylindrical form. As previously explained herein, such an elongate furnace reduces the mean beam path length for radiation but enhances the rate of external heat loss from the walls of the furnace in comparison with a comparable furnace of equal volume but lower aspect ratio. Accordingly, the ratio of the rate of supply of the impure oxygen to the rate of supply of the unenriched air can be larger than if a conventional, relatively short, furnace were employed. This in turn makes possible the creation of higher temperatures in the thermal dissociation zone 14, making possible a greater degree of thermal dissociation of hydrogen sulphide. As a result, there is a greater contribution to the regulation of local temperatures within the flame 12, which can also be taken into account when determining the ratio of the rate of supply of impure oxygen to the rate of supply of unenriched air.

The flame 12 rapidly diverges from its root and at its maximum width occupies at least 80% of the internal cross-sectional area of the furnace 2 coplanar therewith and preferably substantially fills the entire coplanar cross-sectional area within the furnace 2. As previously explained, this arrangement keeps to a minimum short-circuiting of gas molecules from the tip of the burner to the furnace outlet.

The flame 12 extends approximately one half of the way along the longitudinal axis of the furnace 2. There is therefore downstream of the flame 12 an elongate reaction region 20. Typically, hydrogen sulphide and sulphur dioxide molecules react within the flame to form sulphur vapour and water vapour in accordance with the equation:

$$2H_2S + SO_2 = 2H_2O + 3S$$

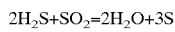

Various other reactions will take place depending on the particular operating conditions in the furnace 2. For example, carbon monoxide (itself formed by thermal dissociation of carbon dioxide or by reaction of carbon dioxide with hydrogen sulphide) reacts with sulphur vapour to form carbon oxy-sulphide. Carbon disulphide is also formed. In addition, there is reaction, we believe, between hydrogen (formed by the thermal dissociation of the hydrogen sulphide) with sulphur dioxide to form further sulphur vapour and water vapour.

An effluent gas mixture consisting essentially of hydrogen sulphide, sulphur dioxide, sulphur vapour, water vapour, carbon dioxide, hydrogen and carbon monoxide and also including minor amounts of carbon oxysulphide and carbon disulphide and other molecular species leaves the furnace 2 through an outlet 22 at a temperature typically in the range of about 1350 and about 1650° C. The outlet temperature may be selected in accordance with the choice of refractory material 24 for lining the interior walls of the furnace 2. Modern refractories can typically withstand continuous operating temperatures of up to about 1650° C.

The gas mixture leaving the outlet 22 of the furnace 2 passes through a waste heat boiler 26 so as to reduce its temperature to a little above the point at which sulphur vapour condenses and, downstream of the waste heat boiler 26, through a condenser 28 in which the gas mixture is cooled to below the dew point of sulphur so as to form liquid sulphur. The liquid sulphur which is condensed out is passed to storage. The resulting gas mixture flows from the condenser 28 with a mole ratio of hydrogen sulphide to sulphur dioxide of 2:1 through successive catalytic Claus stages 30, 32 and 34. Each of the stages 30, 32 and 34 may in accordance with the general practice in the art comprise a train of units consisting, in sequence, of a reheater (not shown) to raise the temperature of the gas mixture to a temperature suitable for catalytic reaction between hydrogen sulphide and sulphur dioxide, a catalytic reactor (not shown) in which hydrogen sulphide reacts with sulphur dioxide to form sulphur and water vapour, and a sulphur condenser (not shown). If desired, depending on the environmental standards which the plant shown in the drawings is required to meet, one or more of the catalytic stages 30, 32 and 34 may be omitted.

The gas mixture leaving the most downstream catalytic stage 34 may be subjected to any one of a number known treatments for rendering Claus process effluent suitable for discharge to the atmosphere. For example, the gas mixture may pass to a hydrolysis reactor 36 in which the components present in the gas mixture are subjected to hydrolysis and hydrogenation. In the reactor 36, residual carbon oxysulphide and carbon disulphide are hydrolysed with water vapour to produce hydrogen sulphide over a catalyst, for example alumina impregnated with cobalt and molybdenum. Such catalysts are well known in the art. At the same time, residual elemental sulphur and sulphur dioxide are hydrogenated to form hydrogen sulphide.

The hydrolysis and hydrogenation take place on the aforesaid impregnated alumina catalyst at a temperature typically in the range of about 300 to about 350° C. A resulting gas mixture consisting essentially of hydrogen sulphide, nitrogen, carbon dioxide, water vapour and hydrogen leaves the reactor 36 and flows first to a water condensation unit (not shown) and then to a separate unit (not shown) in which hydrogen sulphide is separated, for example by chemical absorption. A suitable chemical absorbent is methyl diethylamine. If desired, the hydrogen sulphide may be recycled to the furnace 2, for example by being mixed with the incoming hydrogen sulphide containing feed gas stream.

What is claimed is:

1. A method of treating a combustible gas stream containing hydrogen sulphide, comprising:

burning a part of the hydrogen sulphide content of the gas stream in a flame which extends generally longitudinally within a furnace from a root at least adjacent its upstream end towards an outlet at its downstream end, causing oxygen molecules to enter the flame to support combustion of hydrogen sulphide therein so as to form sulphur dioxide and water vapour;

creating within the flame one or more relatively oxygen-poor endothermic, hydrogen sulphide dissociation regions in which sulphur vapour is formed by thermal dissociation and one or more relatively oxygen-rich combustion regions;

allowing residual hydrogen sulphide to react within the furnace with said sulphur dioxide so as to form further sulphur vapour;

withdrawing an effluent gas stream containing sulphur vapour, water vapor, hydrogen sulphide and sulphur dioxide from said outlet end of the furnace; and recovering sulphur from the effluent gas stream;

the furnace being of elongate configuration, having an aspect ratio of at least 6:1, and the flame diverging from its root to occupy at its maximum cross-sectional area at least about 80% of the cross-sectional area of the furnace interior coplanar therewith.

2. The method of claim 1, wherein the aspect ratio is in the range of 6:1 to 12:1.

3. The method of claim 1, wherein pure oxygen or oxygen-enriched air is supplied to the flame.

4. The method of claim 1, wherein the length of the flame is from about 40% to about 60% of the axial length of the furnace.

5. The method of claim 1, wherein an oxygen-rich combustion region is created along the axis of the furnace, and an oxygen poor, hydrogen sulphide thermal dissociation region is created in a surrounding region contiguous thereto.

6. The method of claim 1, wherein the mole fraction of combustible components in the gas stream is at least about 0.7.

7. The method of claim 1, wherein an oxygen-rich combustion region is created along the axis of the furnace, and an oxygen poor, hydrogen sulphide thermal dissociation region is created within said oxygen-rich combustion region.

8. The method of claim 2, wherein the aspect ratio is in the range of 8:1 and 12:1.

* * * * *